United States Patent [19]

Misono et al.

[11] Patent Number: 5,659,668

[45] Date of Patent: Aug. 19, 1997

[54] KNOWLEDGE BASE CONSTRUCTING SYSTEM

[75] Inventors: Mamoru Misono, Toyonaka; Yasushi Yamamoto, Hirakata; Hideto Doi, Ashiya; Hajime Shiba, Osaka; Yasuhiro Mizokami, Moriguchi; Takafumi Nakayama, Kobe; Hirotsugu Furutate, Sanda, all of Japan

[73] Assignee: Sanyo Electric Co., Ltd., Osaka, Japan

[21] Appl. No.: 314,804

[22] Filed: Sep. 29, 1994

[30] Foreign Application Priority Data

Sep. 30, 1993 [JP] Japan .................................. 5-269641
Jun. 29, 1994 [JP] Japan .................................. 6-148033

[51] Int. Cl.$^6$ ................................................ G06F 15/18
[52] U.S. Cl. .................................... 395/75; 395/77
[58] Field of Search ................................ 395/75, 76, 77, 395/63, 66, 65, 12, 183.02; 364/192

[56] References Cited

U.S. PATENT DOCUMENTS

| | | | |
|---|---|---|---|
| 4,591,983 | 5/1986 | Bennett et al. | 395/65 |
| 4,658,370 | 4/1987 | Erman et al. | 395/76 |
| 4,853,873 | 8/1989 | Tsuji et al. | 395/77 |
| 4,964,125 | 10/1990 | Kim | 395/183.02 |
| 4,972,328 | 11/1990 | Wu et al. | 395/75 |
| 5,019,961 | 5/1991 | Addesso et al. | 364/192 |
| 5,471,560 | 11/1995 | Allard et al. | 395/77 |
| 5,487,132 | 1/1996 | Cheng | 395/63 |
| 5,504,840 | 4/1996 | Hiji et al. | 395/77 |
| 5,506,937 | 4/1996 | Ford et al. | 395/12 |

OTHER PUBLICATIONS

Kim et al., Acquisition of Semantic patterns for Information Extraction from Corpora, Proceedings from the ninth conference on artificial intelligence for applications, pp. 171–175 Mar. 5, 1993.

*Primary Examiner*—Robert W. Downs
*Assistant Examiner*—Sanjiv Shah
*Attorney, Agent, or Firm*—Nikaido, Marmelstein, Murray & Oram LLP

[57] ABSTRACT

A part list for making an operator designate a part related to knowledge to be defined is displayed. The part related to the knowledge is designated by the operator on the basis of the part list. A knowledge type list for making the operator designate the type of the knowledge to be defined is displayed. The type of the knowledge to be defined is designated by the operator on the basis of the knowledge type list. A knowledge defining way candidate list for making the operator designate a knowledge defining way which can be used with respect to the designated type of the knowledge is displayed. The knowledge defining way is designated by the operator on the basis of the knowledge defining way candidate list. A required information item to be inputted is displayed in accordance with the designated type of the knowledge and the designated knowledge defining way. Required information is inputted by the operator on the basis of the displayed information item to be inputted. The knowledge is defined and is registered in a knowledge base on the basis of the required information inputted.

9 Claims, 12 Drawing Sheets

KNOWLEDGE BASE CONSTRUCTING SYSTEM

BACKGROUND OF THE INVENTION

1. Field of the Invention

The present invention relates to a knowledge base constructing system which a knowledge owner himself or herself having no elementary knowledge for constructing a knowledge base can operate as a knowledge base constructor.

2. Description of the Prior Art

A knowledge base is generally one type of computer program which is described in a predetermined knowledge describing language. In constructing the knowledge base, specialized knowledge and experience about the knowledge describing language are required.

A system 509 for constructing a knowledge base 501 has been conventionally operated by a system developer 510 having specialized knowledge and experience about a knowledge describing language, as shown in FIG. 11.

The system developer 510 has an oral interview with a knowledge owner 511 to acquire knowledge from the knowledge owner 511 in constructing a knowledge base. In addition, the system developer 510 systematizes the knowledge acquired from the knowledge owner 511, and operates the knowledge base constructing system 509 to construct the knowledge base 501.

In such a conventional knowledge base constructing method, however, an interview between the system developer 510 and the knowledge owner 511 is orally held, thereby to make it difficult to acquire complete knowledge by holding the interview once. Particularly in constructing a large-scale system, it is impossible to acquire complete knowledge even at an oral interview.

As a result, some problems arise. For example, knowledge must be added or corrected even after the knowledge base 501 is constructed once.

Furthermore, the inventors of the present application have proposed a knowledge base constructing system which a knowledge owner himself or herself can operate as a knowledge base constructor (see Japanese Patent Laid-Open Gazette No. 175852/1994).

This system is a knowledge base constructing system 602 in which a knowledge owner himself or herself can easily construct a knowledge base 601 as a knowledge base constructor 608, as shown in FIG. 12. The knowledge base constructing system 602 is constituted by a data base 604, a data converter 603, a hierarchical structure definition device 605, a detailed knowledge definition device 606, and a knowledge reference device 607.

Data having its data structure constituted by a hierarchical structure relating a plurality of nodes to each other and detailed knowledge defined in each of the nodes is stored in the data base 604.

The data converter 603 makes conversion in the language form between a language used in the data base 604 and a knowledge describing language used in the knowledge base 601.

The hierarchical structure definition device 605 is a device for defining a hierarchical structure of knowledge in a simple operation. The detailed knowledge definition device 606 is a device for defining detailed knowledge in a simple operation with respect to each of the nodes in the hierarchical structure defined in the data base 604. The knowledge reference device 607 is a device for referring to knowledge in another node or another knowledge base in defining the detailed knowledge.

The knowledge base constructor 608 makes it possible to easily describe or change the knowledge by operating the hierarchical structure definition device 605, the detailed knowledge definition device 606, and the knowledge reference device 607.

In the above described conventional technique, however, each of the hierarchical structure definition device 605, the detailed knowledge definition device 606 and the knowledge reference device 607 is directly coupled to the data base 604 in the system 602. Accordingly, each of the hierarchical structure definition device 605, the detailed knowledge definition device 606 and the knowledge reference device 607 must have a function of accessing the data base 604, so that the processing load is increased and the construction of the knowledge base constructing system itself becomes complicated.

SUMMARY OF THE INVENTION

An object of the present invention is to provide a knowledge base constructing system in which a knowledge owner himself or herself can easily construct a knowledge base as a knowledge base constructor.

Another object of the present invention is to provide a knowledge base constructing system capable of utilizing processing such as the judgment of validity and the solution to a problem during knowledge base constructing work and capable of increasing the precision of a knowledge base outputted to decrease feedback work such as debug.

A first knowledge base constructing system according to the present invention is characterized by comprising model shape knowledge registering means for previously defining knowledge about a model shape of a part and registering the model shape knowledge in a knowledge base, part type displaying means for displaying a part list for making an operator designate a part related to knowledge to be defined, part type inputting means for making the operator designate the part related to the knowledge to be defined on the basis of the part list, knowledge type displaying means for displaying a knowledge type list for making the operator designate the type of the knowledge to be defined, knowledge type inputting means for making the operator designate the type of the knowledge on the basis of the knowledge type list, knowledge defining way displaying means for displaying a knowledge defining way candidate list for making the operator designate a knowledge defining way which can be used with respect to the designated type of the knowledge, knowledge defining way inputting means for making the operator designate the knowledge defining way on the basis of the knowledge defining way candidate list, required information item displaying means for displaying a required information item to be inputted in accordance with the designated type of the knowledge and the designated knowledge defining way, required information inputting means for making the operator input required information on the basis of the displayed information item to be inputted, and knowledge defining means for defining the knowledge on the basis of the inputted required information and registering the knowledge in the knowledge base.

It is desirable to provide knowledge validity judging means for judging the validity of the knowledge defined by the knowledge defining means, displaying, when it is judged that the knowledge lacks the validity, the result of the judgment, the reason for the judgment and knowledge data related to the reason for the judgment, and urging the knowledge data related to the reason for the judgment to be corrected.

Furthermore, it is desirable to provide part shape displaying means for displaying the shape of the part designated by the part type inputting means and shape recognizing means for recognizing, by making the operator designate a shape element, the designated shape element on a part shape displayed by the part shape displaying means and sending the result of the recognition to the knowledge defining means.

In the first knowledge base constructing system according to the present invention, the model shape knowledge of the part is previously defined and is registered in the knowledge base.

The part list for making the operator designate the part related to the knowledge to be defined is displayed. The part related to the knowledge to be defined is designated by the operator on the basis of the part list.

The knowledge type list for making the operator designate the type of the knowledge to be defined is displayed. The type of the knowledge is designated by the operator on the basis of the knowledge type list.

The knowledge defining way candidate list for making the operator designate the knowledge defining way which can be used with respect to the designated type of the knowledge is displayed. The knowledge defining way is designated by the operator on the basis of the knowledge defining way candidate list.

The information item to be inputted is displayed in accordance with the designated type of the knowledge and the designated knowledge defining way. The required information is inputted by the operator on the basis of the displayed information item to be inputted.

The knowledge is defined and is registered in the knowledge base on the basis of the inputted required information.

According to the first knowledge base constructing system according to the present invention, it is possible for a knowledge owner himself or herself to easily construct the knowledge base.

A second knowledge base constructing system according to the present invention is characterized by comprising knowledge inputting means to which knowledge of a knowledge base constructor is inputted for defining knowledge to be constructed, knowledge processing means for processing the knowledge inputted to the knowledge inputting means to output the knowledge as a knowledge base, controlling means for controlling the knowledge inputting means and the knowledge processing means, and a storage device for storing a work hysteresis of the knowledge processing means and the knowledge base outputted by the knowledge processing means, the knowledge inputting means comprising drafting knowledge defining and editing means for defining and/or editing drafting knowledge, hierarchical structure defining and editing means for defining and/or editing a hierarchical structure, and character string knowledge defining and editing means for defining and/or editing character string knowledge, whereby the drafting knowledge, the hierarchical structure and the character string knowledge are individually inputted and are defined.

The above described knowledge processing means is constituted by means such as knowledge base managing means for controlling the storage device, knowledge format converting means for making conversion between a format of the knowledge defined by the knowledge inputting means and a format of the knowledge base, and knowledge reference means for retrieving required data from the knowledge base stored in the storage device.

The above described knowledge processing means may be provided with knowledge validity judging means for judging the validity of the knowledge defined by the knowledge inputting means in addition to the knowledge base managing means, the knowledge format converting means and the knowledge reference means.

The above described knowledge processing means may be provided with problem solving means for finding an answer to a given problem on the basis of the knowledge base stored in the storage device in addition to the knowledge base managing means, the knowledge format converting means and the knowledge reference means.

The above described knowledge processing means may be provided with both the knowledge validity judging means and the problem solving means in addition to the knowledge base managing means, the knowledge format converting means and the knowledge reference means.

According to the first and second knowledge base constructing system according to the present invention, it is possible to simply construct the knowledge base even by a worker having no correct knowledge about the knowledge base.

Since the knowledge reference means is provided in the knowledge processing means controlled by the controlling means, processing for referring to knowledge can be performed as required not only in a case where the knowledge base constructor requests to refer to knowledge but also during work other than the request to refer to knowledge, for example, a case where knowledge is edited.

Additionally, if the knowledge processing means is provided with the knowledge validity judging means in addition to the knowledge base managing means, the knowledge format converting means and the knowledge reference means, it is possible to judge the validity of the inputted knowledge during knowledge base constructing work.

Furthermore, if the knowledge processing means is provided with the problem solving means in addition to the knowledge base managing means, the knowledge format converting means and the knowledge reference means, it is possible to automatically solve the given problem.

Since the knowledge inputting means is provided with the drafting knowledge defining and editing means, the hierarchical structure defining and editing means and the character string knowledge defining and editing means, the knowledge defined and/or edited by the means can be individually inputted, thereby to further simplify input of the knowledge.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flow chart showing the operation of the knowledge base constructing system in a case where knowledge is referred to;

DESCRIPTION OF THE PREFERRED EMBODIMENTS

Description is now made of embodiments of the present invention with reference to the drawings.

Referring now to FIGS. 1 to 4, a first embodiment of the present invention will be described.

Figure 1:
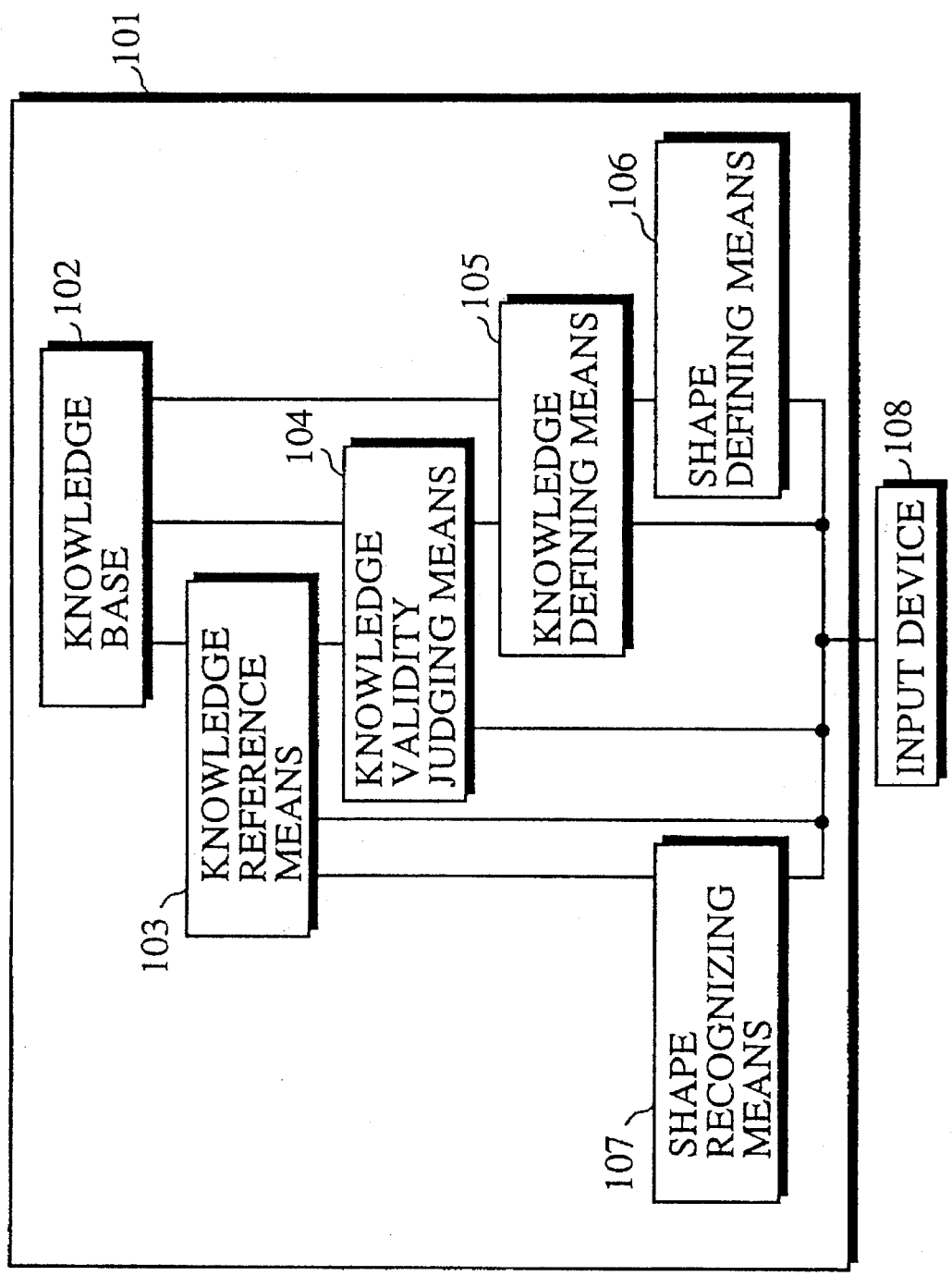
FIG. 1 is a block diagram showing the construction of a knowledge base constructing system according to a first embodiment of the present invention.

FIG. 1 illustrates the construction of a knowledge base constructing system 101.

The knowledge base constructing system 101 comprises a knowledge base 102, knowledge defining means 105, shape defining means 106, knowledge reference means 103, knowledge validity judging means 104, and shape recognizing means 107. Various types of data and various types of requests are inputted to the knowledge base constructing system 101 from an input device 108.

Various types of knowledge are registered in the knowledge base 102. The following are the types of knowledge:

(1) Shape knowledge about a model shape of a part required so as to utilize shape information in the knowledge defining means 105.

(2) Parent-child knowledge for specifying the parent-child relationship of information.

(3) Inclusion knowledge for specifying the inclusion relationship of information.

(4) Arrangement knowledge for specifying the arrangement relationship.

(5) Shape attribute-related knowledge for specifying a shape attribute.

(6) Non-shape attribute-related knowledge for specifying a non-shape attribute.

(7) Condition branch knowledge for specifying the state of a condition branch.

(8) Evaluation knowledge for evaluating the state on a certain basis.

(9) Function knowledge.

(10) Standard knowledge having standard information inside and outside the company.

Furthermore, the following are examples of a method of representing knowledge.

(1) Master-slave relationship representation in which a slave attribute (an attribute A) is not defined until a master attribute (an attribute B) is defined, for example, "an attribute A is twice an attribute B".

(2) Equal relationship representation in which if either attribute (for example, an attribute B) is determined, the remaining attribute (an attribute A) is determined, for example, "the sum of an attribute A and an attribute B is 10".

Figure 3:
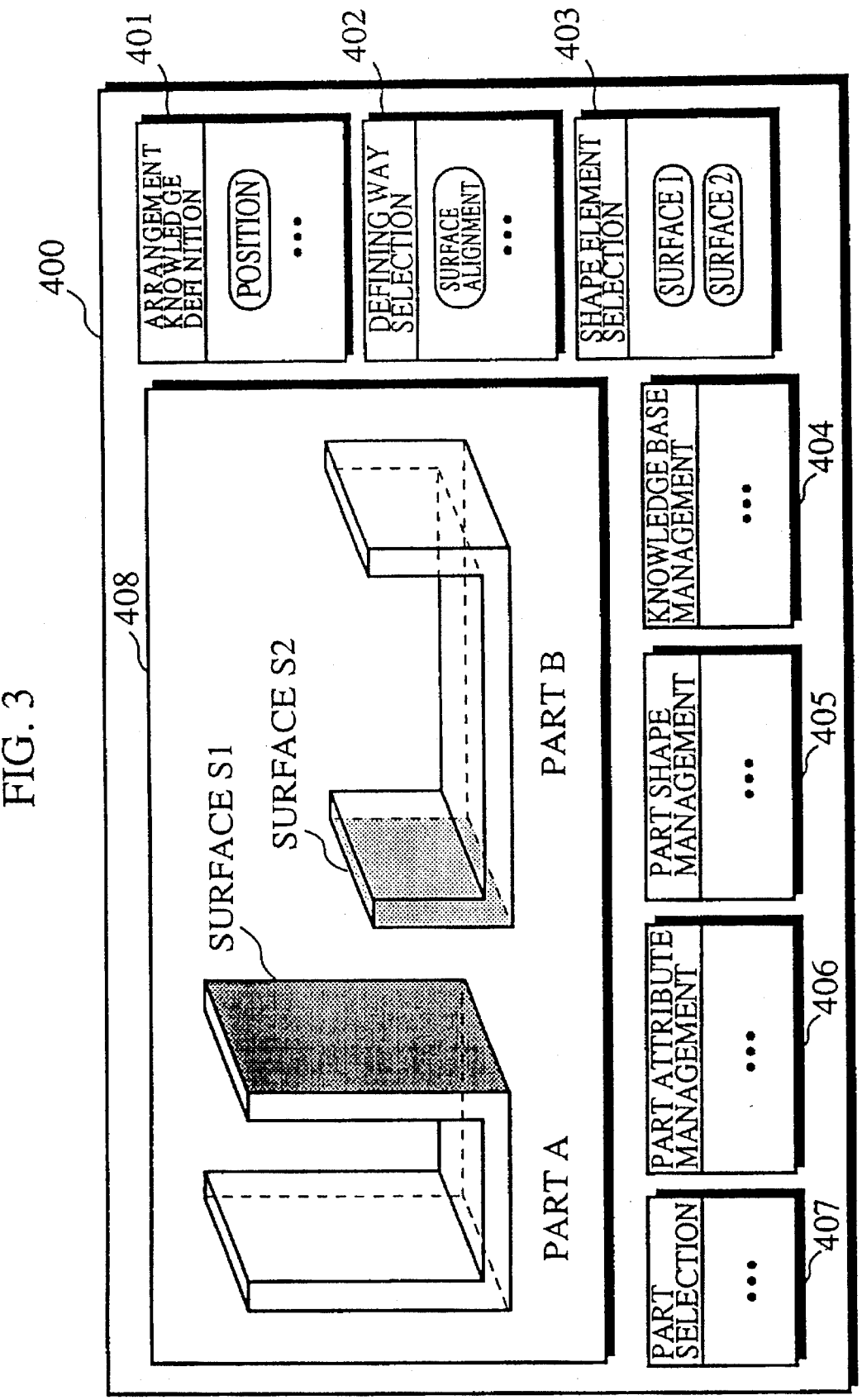
FIG. 3 is a schematic view showing an example of a case where arrangement knowledge is defined.

The knowledge defining means 105 is for defining knowledge in the knowledge base 102. The knowledge defining means 105 has the following means (a) to (c):

(a) Knowledge type displaying means for displaying, on a knowledge type selection list 401 in a knowledge definition screen 400 shown in FIG. 3, a list of types of knowledge which can be defined.

(b) Knowledge defining way displaying means for displaying, on a knowledge defining way selection list 402 shown in FIG. 3, a list of knowledge defining way which can be used in the selected type of knowledge.

(c) Displaying means such as required information item displaying means for displaying, on a required information item display list 403 shown in FIG. 3, a required information item in the selected knowledge defining way.

The knowledge reference means 103 is for retrieving, referring to, displaying or selecting the knowledge defined in the knowledge base 102. The knowledge reference means 103 has the following means (a) to (e):

(a) Part type displaying means for displaying, on a part selection list 407 in the knowledge definition screen 400 shown in FIG. 3, a list of parts each having its model part knowledge registered in the knowledge base 102.

(b) Displaying means of a command related to a part shape for displaying, on a part shape management list 405 shown in FIG. 3, a command such as a shape display command for displaying the detailed shape of a part selected on the basis of the part selection list 407 or an enlargement and reduction command for enlarging or reducing a figure displayed.

(c) Shape displaying means for displaying, on a shape display list 408 shown in FIG. 3, the shape of the part selected on the basis of the part selection list 407 when the shape display command is selected on the part shape management list 405.

(d) Display means of a command related to a part attribute for displaying, on the part attribute management list 405 shown in FIG. 3, a command such as an attribute list display command for displaying a list of attributes of the part selected on the basis of the part selection list 407.

(e) Displaying means such as attribute displaying means for displaying, on a shape display list 408 shown in FIG. 3, the list of attributes of the part selected on the basis of the part selection list 407 when the attribute list display command is selected on the part attribute management list 405.

The shape recognizing means 107 is for recognizing respective elements (shape elements) in the shape displayed on the shape display list 408 shown in FIG. 3 by the knowledge reference means 103. Consequently, an operator designates a shape element on the shape display list 408 using a mouse or the like, thereby to make it possible to simply obtain information related to the required shape element without being described in a character string.

Furthermore, a shape attribute specified by the shape element recognized by the shape recognizing means 107 can be retrieved and displayed by the knowledge reference means 103. Consequently, the operator designates the shape element on the shape display list 408 using the mouse or the like, thereby to make it possible to simply obtain a shape attribute specified by the required shape element without being described in a character string.

The knowledge validity judging means 104 judges the validity of a format of the knowledge defined by the knowledge defining means 105, the validity of knowledge for restraining the defined knowledge, the validity with respect to endless looping of a group of defined knowledge. The knowledge for restraining the defined knowledge is derived by retrieving and referring to restraining knowledge in the knowledge base 102 related to the defined knowledge using the knowledge reference means 103.

When the knowledge validity judging means 104 judges that the defined knowledge lacks the validity, it displays the result of the judgment, the reason for the judgment and knowledge data related to the reason for the judgment. In this case, knowledge data to be corrected is selected from the displayed knowledge data and corrected using the knowledge defining means 105.

Furthermore, the knowledge validity judging means 104 refers to the knowledge registered in the knowledge base 102 using the knowledge reference means 103, analyzes the relation between the knowledge, and judges the presence or absence of information which is not specified (hereinafter referred to as non-specified information) existing in the knowledge base 102. Two types of patterns exist in the non-specified information. One of them is a pattern in which the information is not defined and referred to in any knowledge. In this case, all non-specified information are non-specified information to be specified.

The other one is a pattern in which the information is described in any knowledge but is not specified by the knowledge and a group of knowledge related thereto. The information described in the group of knowledge form a group of non-specified information. In this case, the non-specified information to be specified can be narrowed down on the basis of the master-slave relationship of the information existing in the group of non-specified information.

If it is judged by the knowledge validity judging means 104 that the non-specified information exist, a list of non-specified information to be specified is displayed. Consequently, knowledge for specifying the non-specified information is defined using the knowledge defining means 105. In this case, a lot of non-specified information may, in some cases, be specified by defining one knowledge.

Figure 2:
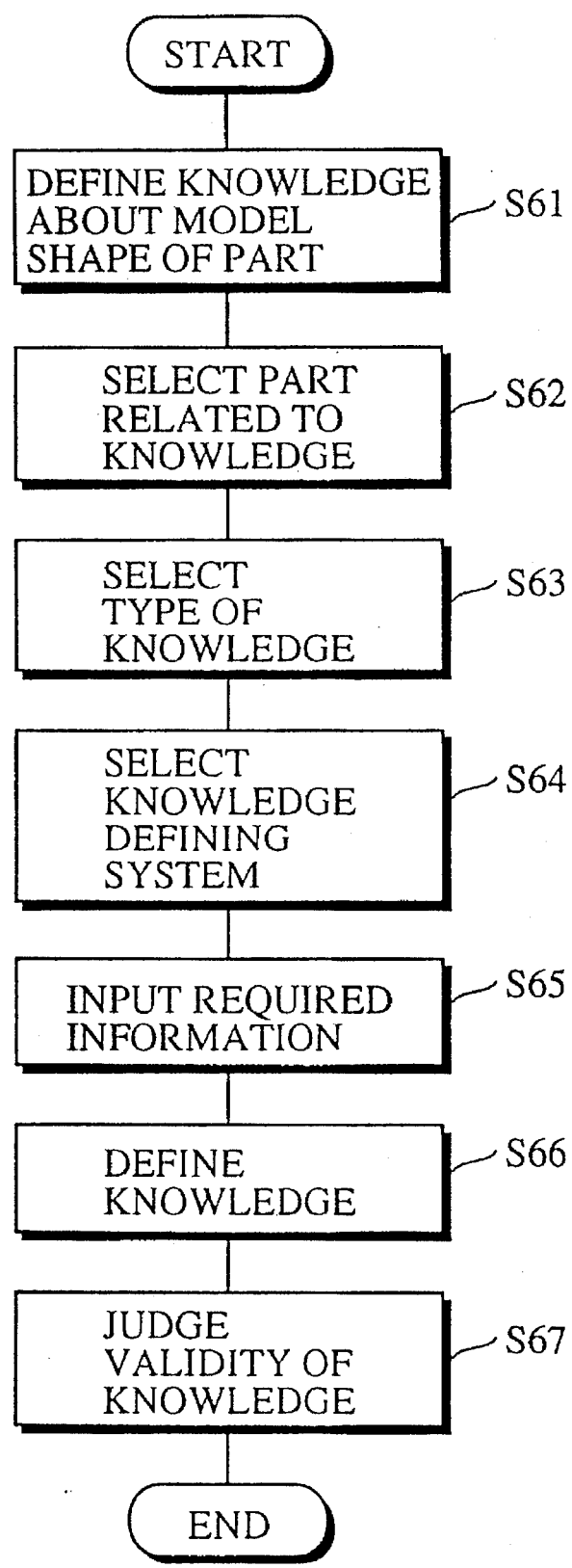
FIG. 2 is a flow chart showing the procedure for knowledge defining processing.

FIG. 2 illustrates the procedure for knowledge defining processing performed by the knowledge base constructing system.

For example, when a knowledge base related to the design of a certain product is constructed, knowledge about a model shape of a part related to the design of the product is first defined and is registered in the knowledge base 102 (step S61). Model shape knowledge of a part is shape structure knowledge used in defining knowledge utilizing shape information, which includes information such as a model shape and an attribute item for specifying the model shape. That is, model shape knowledge of a part is constituted by shape data such as a surface or a line, a shape characteristic attribute such as a length or an angle for specifying the shape data and a shape feature attribute such as a surface center position or a surface normal vector included in the shape data.

In the above described step S61, data about the model shape of the part related to the design of the product is defined by the shape defining means 106, after which a shape characteristic attribute and a shape feature attribute are added to define the model shape knowledge of the part by the knowledge defining means 105, and the defined model shape knowledge of the part is registered in the knowledge base 102.

A list of parts each having model information previously defined is then displayed on the part selection list 407 shown in FIG. 3 using the knowledge reference means 103. A part related to the defined knowledge is selected from the parts displayed on the part selection list 407 (step S62).

A list of types of knowledge is then displayed on the knowledge type selection list 401 shown in FIG. 3 by the knowledge type displaying means in the knowledge defining means 105. The type of knowledge such as arrangement knowledge or part shape attribute knowledge is selected from the list of types of knowledge displayed on the knowledge type selection list 401 (step S63).

If the defined knowledge is selected, a list of candidates for a defining way of the knowledge selected in the step S63 is displayed on the knowledge defining way selection list 402 shown in FIG. 3 by the knowledge defining way displaying means in the knowledge defining means 105, thereby to select a knowledge defining way from the list of candidates for a defining way displayed on the knowledge defining way selection list 402 (step S64).

If the knowledge defining way is selected, a required information item in the defining way selected in the above described step S64 is displayed on the required information item display list 403 shown in FIG. 3 by the required information item displaying means in the knowledge defining means 105, thereby to input required information on the basis of the required information item displayed on the required information item display list 403 (step S65). The knowledge defining means 105 defines knowledge on the basis of the inputted required information (step S66), to register the defined knowledge in the knowledge base 102.

In inputting a shape element in a shape of a part as required information, the shape element may be recognized by the shape recognizing means 107 by selecting a shape display command using the part shape information management list 405 shown in FIG. 3 to call the detailed shape of the part on the shape display list 408 shown in FIG. 3 and designating the shape element on the shape display list 408.

Furthermore, the knowledge registered in the knowledge base 102 can be also corrected and registered again using the knowledge reference means 103, the shape defining means 106, the knowledge defining means 105 and the knowledge validity judging means 104 as required.

If the knowledge is defined in the knowledge base 102, the validity of the knowledge is evaluated by the knowledge validity judging means 104 (step S67). When the knowledge lacks the validity, a warning is displayed and its ground is displayed, to urge the knowledge to be corrected.

The validity of the knowledge may be evaluated before the defined knowledge is registered in the knowledge base 102.

FIG. 3 illustrates an example in which arrangement knowledge is defined by the knowledge base constructing system 101.

First, a part A and a part B are selected as parts related to arrangement knowledge in the part selection list 407 on the knowledge definition screen 400.

Arrangement knowledge is then selected as the type of knowledge in the knowledge type selection list 401, to select position knowledge as its sub-knowledge.

A surface alignment way is selected as a defining way of the position knowledge in the knowledge defining way selection list 402. If the surface alignment way is selected, information for specifying two surfaces are required, whereby two items, that is, a surface 1 and a surface 2 are offered in the required information item display list 403.

Thereafter, a shape display command is selected in the part shape management list 405 so as to utilize shape elements of the part A and the part B as the information for specifying the surface 1 and the surface 2, to display the shapes of the part A and the part B on the shape display list 408. A surface S1 which is the shape element of the part A and a surface S2 which is the shape element of the part B are designated on the shape display list 408 as the information for specifying the surface 1 and the surface 2. The surface S1 and the surface S2 which are the designed shape elements are recognized by the shape recognizing means 107, and the results of the recognition are sent to the knowledge defining means 105. Consequently, the knowledge is defined.

It is also possible to select an attribute display command in the part attribute management list 406 to display a list of attributes of a part on the shape display list 408 and select required information by a list of information related to the attributes.

The defined arrangement knowledge is registered in the form of (surface alignment (part A surface S1) (part B surface S2)), for example, in the knowledge base 102 if it is judged that the knowledge is valid.

Figure 4:
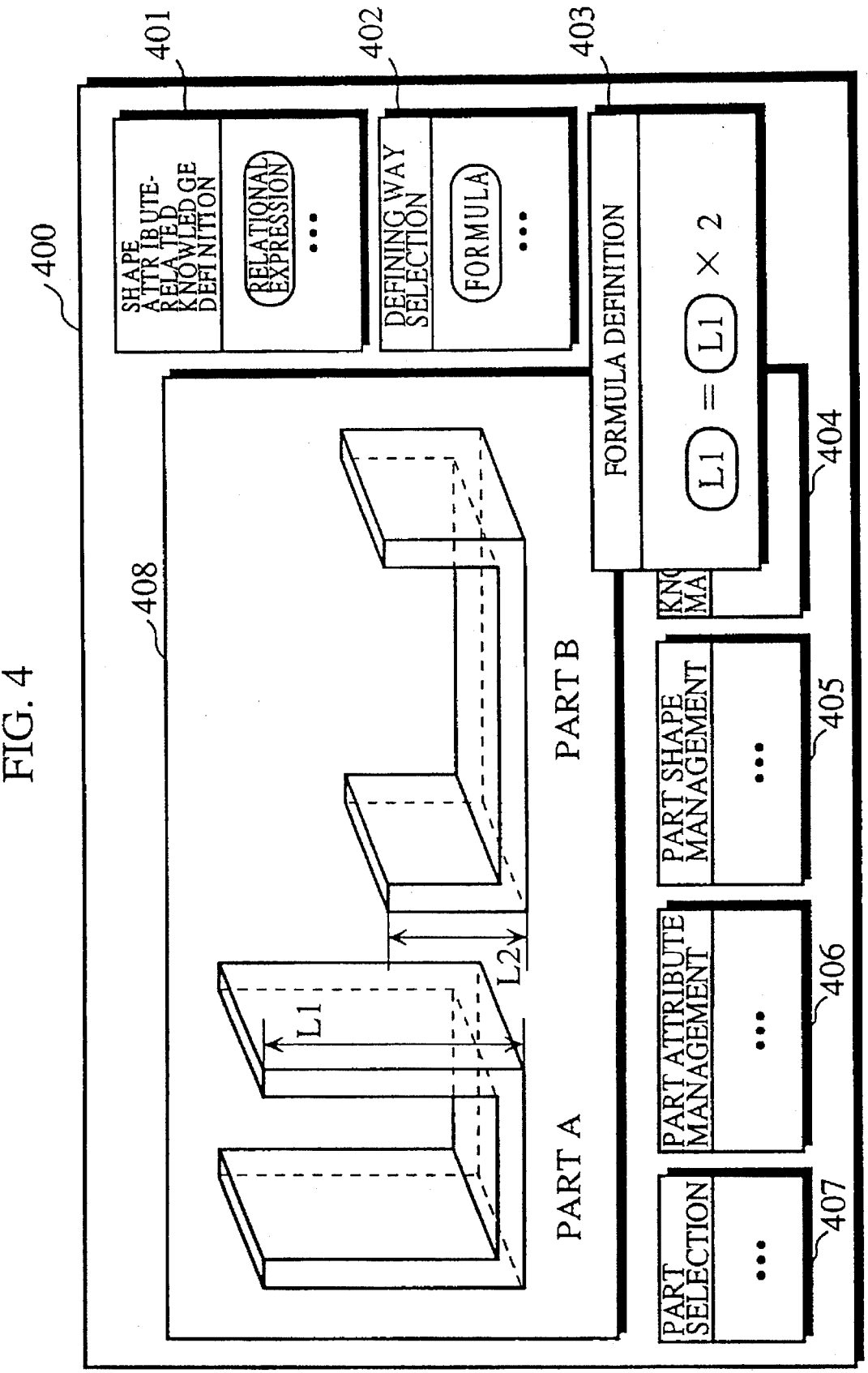
FIG. 4 is a schematic view showing an example of a case where shape attribute-related knowledge is defined.

FIG. 4 illustrates an example in which shape attribute-related knowledge is defined by the knowledge base constructing system 101.

Respective attributes L1 and L2 are designated using shape attribute information of the part A and the part B displayed on the shape display list 408. Specifically, an attribute display command is selected in the part attribute management list 406, thereby to call a list of attribute information of the part A and the part B and display the list on the shape display list 408, and the respective attributes L1 and L2 are designated by the list of attribute information. The defined shape attribute-related knowledge is registered in the form of "(part A L1)=(part B L2)×2", for example, in the knowledge base 102 if it is judged that the knowledge is valid.

In the above described embodiment, knowledge can be defined even if a knowledge defining system is not accurately grasped, thereby to make it possible for a knowledge owner himself or herself to easily construct a knowledge base. In addition, knowledge such as shape knowledge and arrangement knowledge can be easily represented utilizing shape elements visualized, thereby to make it possible for the knowledge owner himself or herself to easily construct the knowledge base.

Referring now to FIGS. 5 to 10, a second embodiment of the present invention will be described.

Figure 5:
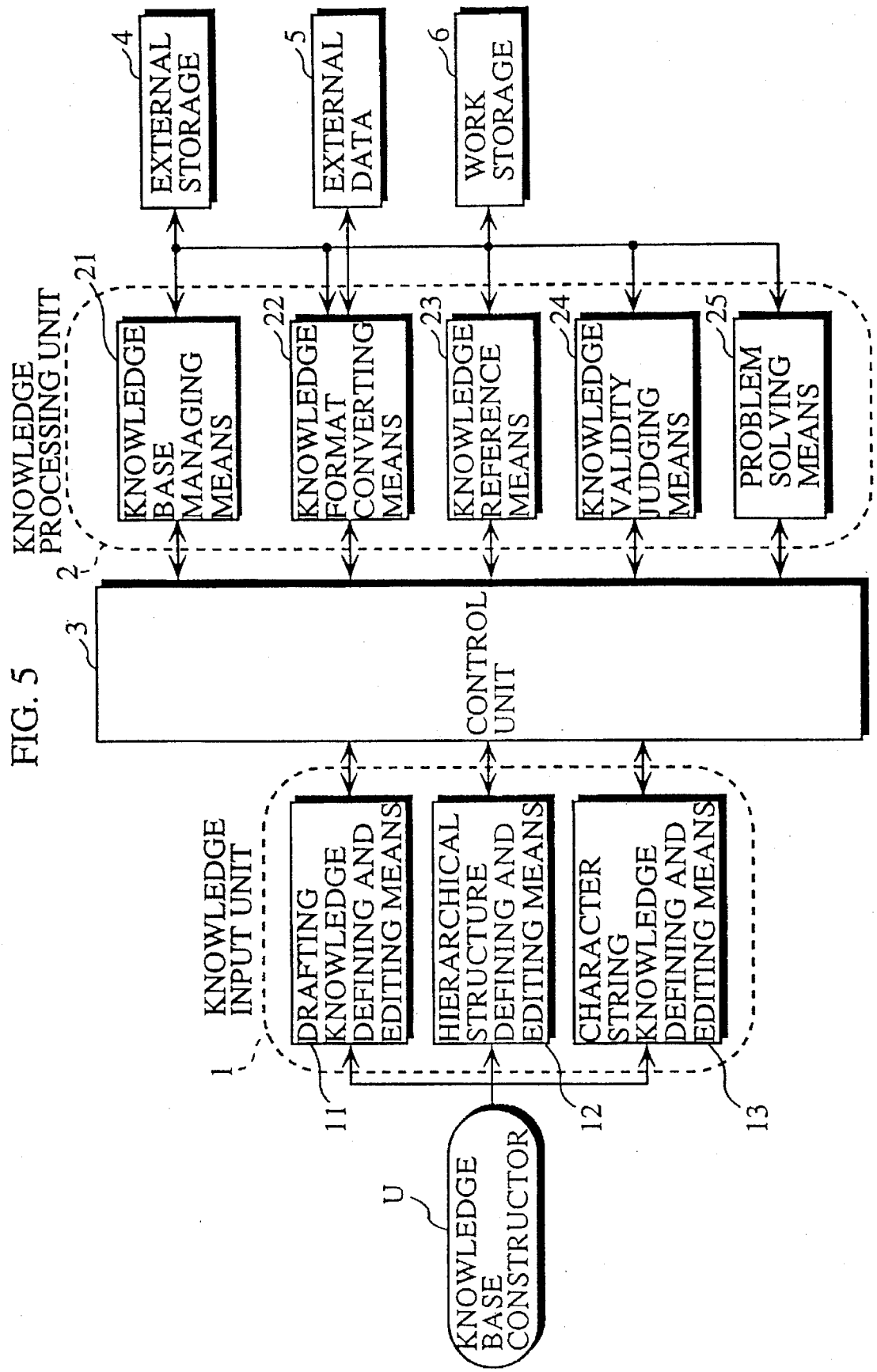
FIG. 5 is a block diagram showing the construction of a knowledge base constructing system according to a second embodiment of the present invention.

FIG. 5 illustrates the schematic construction of the knowledge base constructing system.

A knowledge input unit 1 functions as an interface portion for defining knowledge inputted from a knowledge base constructor (a user) U. The knowledge input unit 1 comprises a drafting knowledge defining and editing means 11, hierarchical structure defining and editing means 12 and character string knowledge defining and editing means 13.

The drafting knowledge defining and editing means 11 is used for defining drafting knowledge and editing the drafting knowledge already defined. In the present invention, the drafting knowledge comprises shape knowledge and arrangement knowledge. The hierarchical structure defining and editing means 12 is used for defining a hierarchical structure and editing the hierarchical structure already defined. The character string knowledge defining and editing means 13 is used for defining character string knowledge and editing the character string knowledge already defined.

A knowledge processing unit 2 processes the knowledge defined by each of the defining and editing means 11, 12 and 13 in the knowledge input unit 1, to construct a knowledge base. The knowledge input unit 1 and the knowledge processing unit 2 are controlled by a control unit 3.

The knowledge processing unit 2 comprises knowledge base managing means 21, knowledge format converting means 22, knowledge reference means 23, knowledge validity judging means 24 and problem solving means 25 in this example.

The knowledge base managing means 21 controls an external storage device 4 and a work storage device 6. The knowledge format converting means 22 converts a format between a language such as a natural language inputted to the knowledge input unit 1 and a predetermined knowledge describing language (hereinafter referred to as a first knowledge describing language) which can be treated by the knowledge base constructing system according to the present invention (particularly, the knowledge processing unit 2, the external storage device 4 and the work storage device 6), and converts a format between the above described first knowledge describing language and a predetermined knowledge describing language (hereinafter referred to as a second knowledge describing language) which can be treated by another processor capable of performing processing utilizing a knowledge base (which may be a device separately incorporated in a personal computer or a work station each incorporating the knowledge base constructing system or a device incorporated in another personal computer or another work station).

The knowledge reference means 23 is for making it possible to refer to the knowledge already defined in defining or editing various types of knowledge, for example.

Knowledge data obtained by the knowledge processing unit 2 is stored in the external storage device 4. External data 5 is data sent to the above described other processor and is data related to the above described second knowledge describing language obtained by format conversion which is treated by the processor on the receiving side by the knowledge format converting means 22 in the knowledge processing unit 2. A work hysteresis of each of the means in the knowledge processing unit 2 and knowledge data obtained as a result of the work are stored in the above described first knowledge describing language in the work storage device 6.

Figure 6:
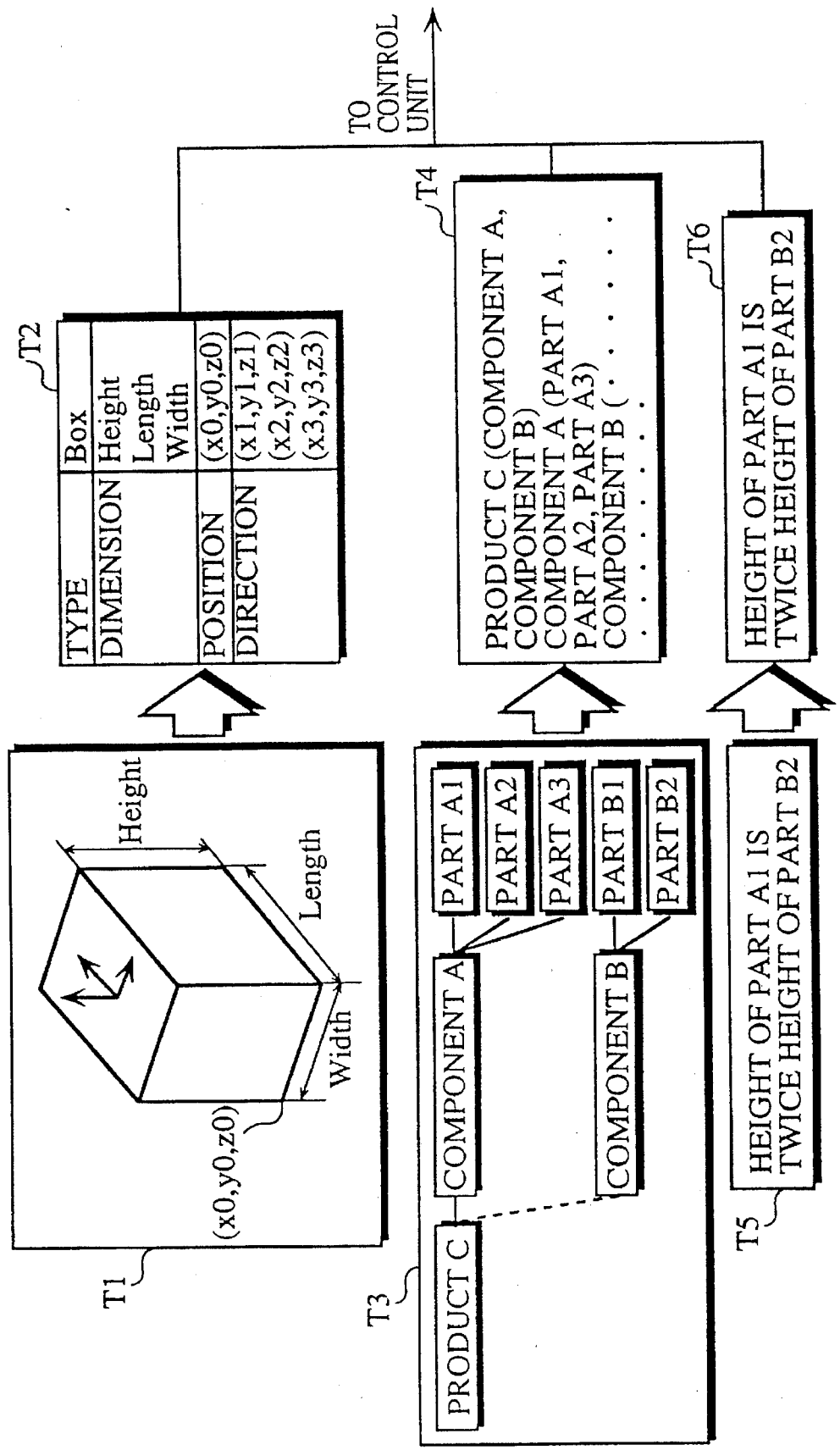
FIG. 6 is an explanatory view for explaining knowledge defined by each defining and editing means.

FIG. 6 is a schematic view showing knowledge inputted to the knowledge input unit 1. Suppose a case where a knowledge base for designing a rectangular block is constructed.

Drafting knowledge T1 includes a reference point, a type, dimensions and a position and a direction. If a rectangular block is represented by drafting knowledge, the rectangular block is represented by "BOX" whose reference point is at coordinates (x0, y0, z0), which has a height "Height", a length "Length" and a width "Width", and whose direction is (x1, y1, z1), (x2, y2, z2) and (x3, y3, z3). x0, x1, x2, x3, y0, y1, y2, y3, z0, z1, z2 and z3 are variables, and "Height", "Length" and "Width" represent attributes. The defined knowledge is developed as shown in a table T2.

Hierarchical structure knowledge T3 is generally knowledge representing a hierarchical structure such as the relationship between a product C and components A and B constituting the product C and the relationship between the components A and B and parts A1, A2, A3, B1 and B2 constituting the respective components A and B. The defined hierarchical structure knowledge T3 is developed as shown in a table T4.

Character string knowledge T5 is knowledge about the relationship between two parts, for example, "the height of the part A1 is twice the height of the part B2", and is inputted in the form of a character string (a sentence) of a natural language. The defined character string knowledge T5 is described as shown in a table T6. Examples of the character string knowledge include knowledge defined by "... is equal to ...", "... is an item to be inputted", and "... is ... times ..." in addition to the foregoing.

The respective tables T2, T4 and T6 thus obtained are sent to the control unit 3.

Figure 7:
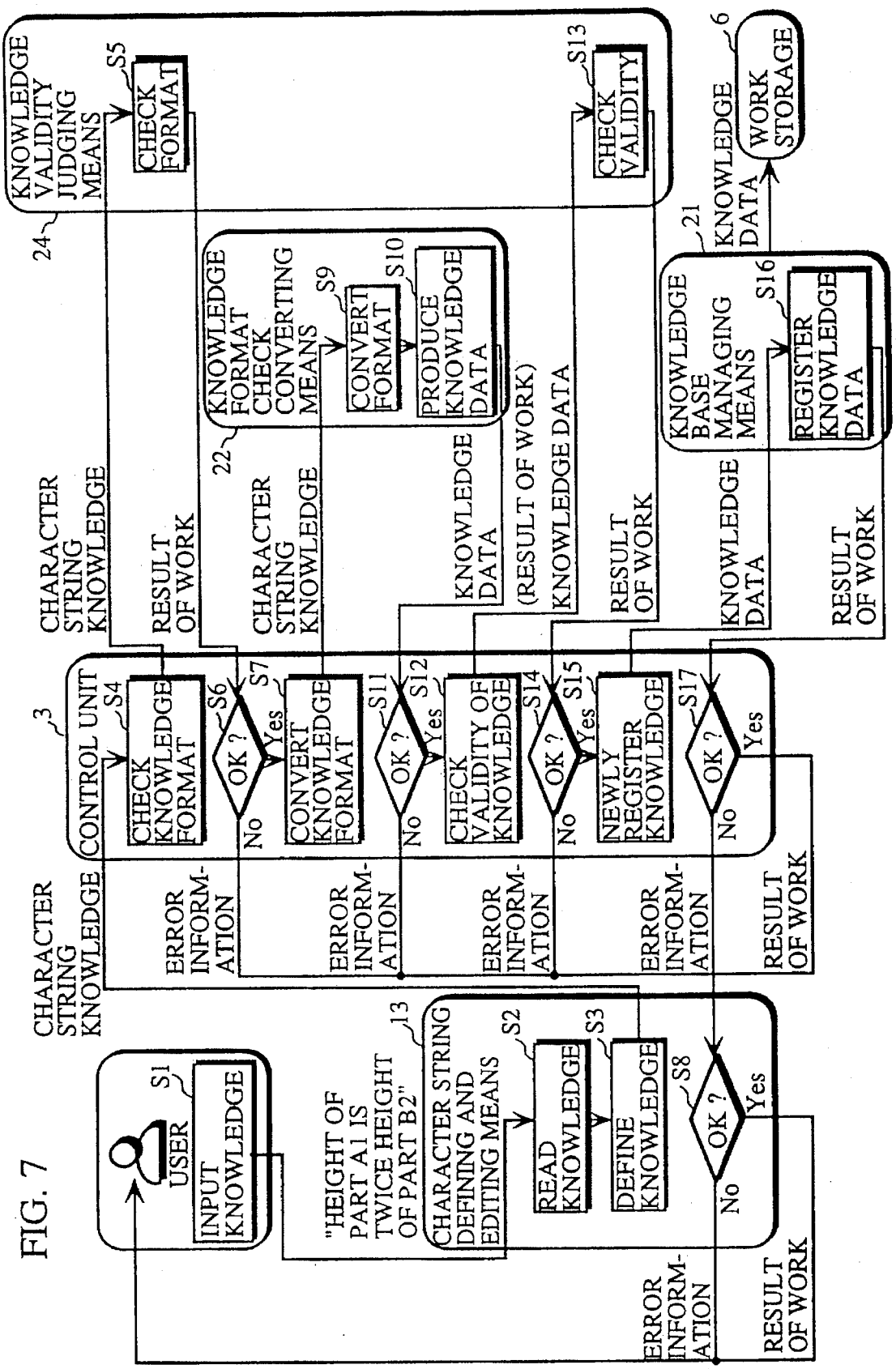
FIG. 7 is a flow chart showing the operation of the knowledge base constructing system in a case where knowledge is defined.

FIG. 7 illustrates the operation of the knowledge base constructing system in a case where knowledge is defined using the knowledge base constructing system. Description is made of a case where the character string knowledge T5 is defined. The same is true for a case where the drafting knowledge or the hierarchical structure knowledge is defined.

If the knowledge (the character string knowledge T5) is inputted by a user U (step S1), the character string knowledge T5 "the height of the part A1 is twice the height of the part B2" is read by the character string knowledge defining and editing means 13 (step S2), and the knowledge is defined and the read knowledge is sent to the control unit 3 (step S3).

If the knowledge read in the step S2 is sent to the control unit 3, the control unit 3 starts the knowledge validity judging means 24 and sends the sent knowledge to the knowledge validity judging means 24 so as to perform a knowledge format check of the read knowledge (step S4). Consequently, the knowledge validity judging means 24 checks a format of the sent knowledge (step S5).

The result of the work performed by the knowledge validity judging means 24 is fed back to the control unit 3, whereby the control unit 3 judges whether or not the format is proper (step S6). If the format is not proper, the control unit 3 feeds back error information to the character string knowledge defining and editing means 13.

If the format is proper, the knowledge format converting means 22 is started and the knowledge read in the step S2 is sent to the knowledge format converting means 22 so as to convert the format of the knowledge read in the step S2 into the format of the above described first knowledge describing language which can be treated by the knowledge processing unit 2, the external storage device 4 and the work storage device 6 (step S7). Consequently, the knowledge format converting means 22 converts the format of the sent knowledge into the format of the predetermined knowledge describing language (step S9), and knowledge data is produced (step S10).

The result of the work indicating whether or not the format conversion is normally made by the knowledge format converting means 22 and the produced knowledge data are fed back to the control unit 3. The control unit 3 judges whether or not the format conversion is normally made on the basis of the result of the work (step S11). If the format conversion is not normally made, the control unit 3 feeds back error information to the character string knowledge defining and editing means 13.

If the format conversion is normally made, the control unit 3 starts the knowledge validity judging means 24 and sends the knowledge data produced in the step S10 to the knowledge validity judging means 24 so as to check the validity of the knowledge data (step S12). Consequently, the knowledge validity judging means 24 checks the validity of the sent knowledge data (step S13).

The result of the work performed by the knowledge validity judging means 24 is fed back to the control unit 3, whereby the control unit 3 judges whether or not the content of the knowledge data is proper (step S14). If the content of the knowledge is not proper, the control unit 3 feeds back error information to the character string knowledge defining and editing means 13.

If the content of the knowledge is proper, the control unit 3 starts the knowledge base managing means 21 so as to newly register the knowledge data produced in the step S10 (step S15). Consequently, the knowledge base managing means 21 registers the knowledge data produced in the step S10 in the work storage device 6 as new knowledge data (step S16).

The result of the work indicating whether or not the knowledge data is newly registered normally by the knowledge base managing means 21 is fed back to the control unit 3. The control unit 3 judges whether or not the new registration is normal on the basis of the result of the work (step S17). If the new registration is not normal, the control unit 3 feeds back error information to the character string knowledge defining and editing means 13.

If the new registration is normal, the control unit 3 feeds back the result of the work to the character string knowledge defining and editing means 13.

Finally, the character string knowledge defining and editing means 13 makes the general judgment of the above described all steps on the basis of the error information and the result of the work sent from the control unit 3 (step S8). The result of the judgment is fed back to the user U. The user U perceives whether or not the knowledge is normally inputted by the result of the judgment fed back. The user U starts the subsequent work depending on the result of the perception.

Figure 8:
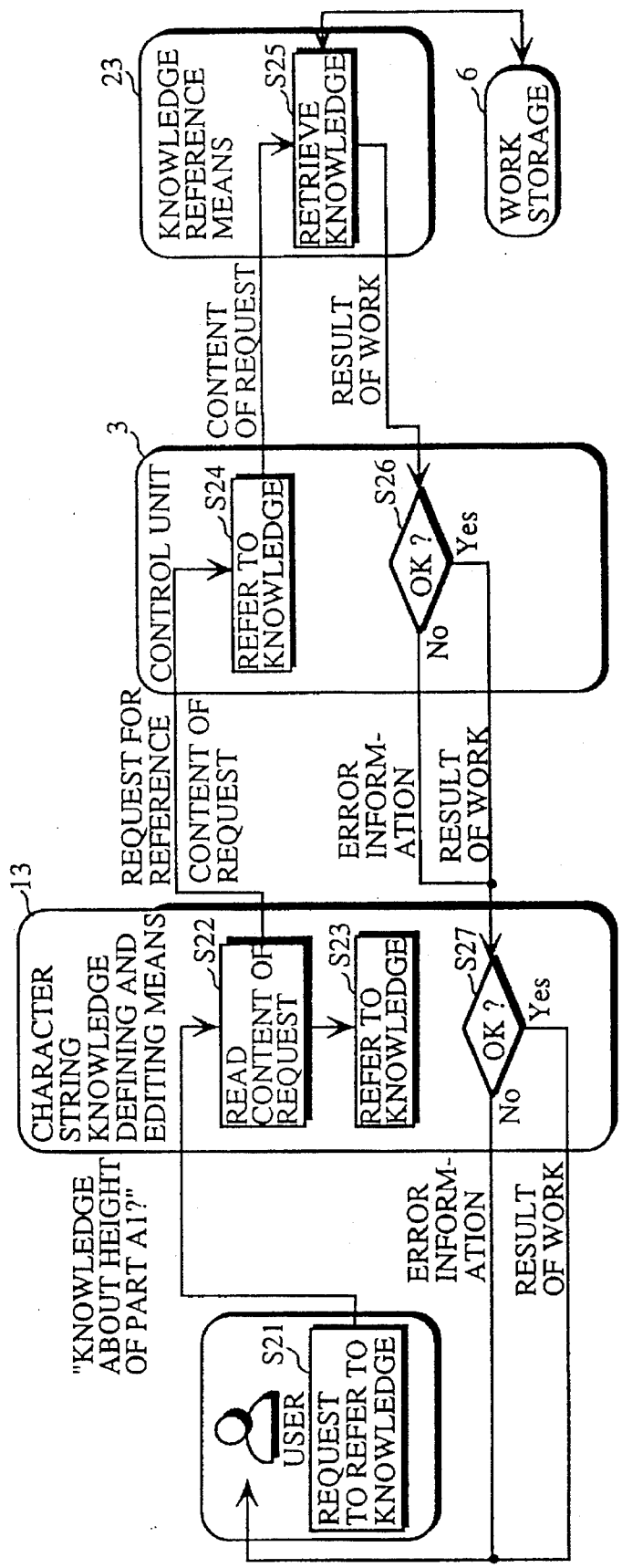

FIG. 8 illustrates the operation of the knowledge base constructing system in a case where knowledge already registered is referred to. Although description is made of a case where the character string knowledge is referred to, the same is true for the operation in a case where the drafting knowledge or the hierarchical structure knowledge is referred to.

If a request to refer to knowledge, for example, "What is knowledge about the height of the part A1?" is inputted to the character string knowledge defining and editing means 13 by a user U (step S21), the content of the request to refer to knowledge is read by the character string knowledge defining and editing means 13 (step S22). In addition, a request for reference and the content of the request for reference are sent to the control unit 3 so as to refer to knowledge (step S23).

The control unit 3 starts the knowledge reference means 23 and sends the content of the request for reference to the knowledge reference means 23 so as to retrieve knowledge to be referred to from the work storage device 6 when the request for reference and the content of the request for reference are sent (step S24). Consequently, the knowledge reference means 23 retrieves knowledge corresponding to the content of the request for reference from the work storage device 6 (step S25). The result of the retrieval (the result of the work) is fed back to the control unit 3.

The control unit 3 judges whether or not the knowledge corresponding to the content of the request for reference is retrieved on the basis of the result of the work (step S26). When the knowledge corresponding to the content of the request for reference is not retrieved, the control unit 3 feeds back error information to the character string knowledge defining and editing means 13. When the knowledge corresponding to the content of the request for reference is retrieved, the control unit 3 feeds back the result of the work to the character string knowledge defining and editing means 13.

The character string knowledge defining and editing means 13 judges whether or not the knowledge to be referred to is obtained on the basis of the information fed back from the control unit 3 (step S27), and feeds back the result of the work to the user U if the knowledge to be referred to is obtained, while feeding back error information to the user U if the knowledge to be referred to is not obtained.

Figure 9:
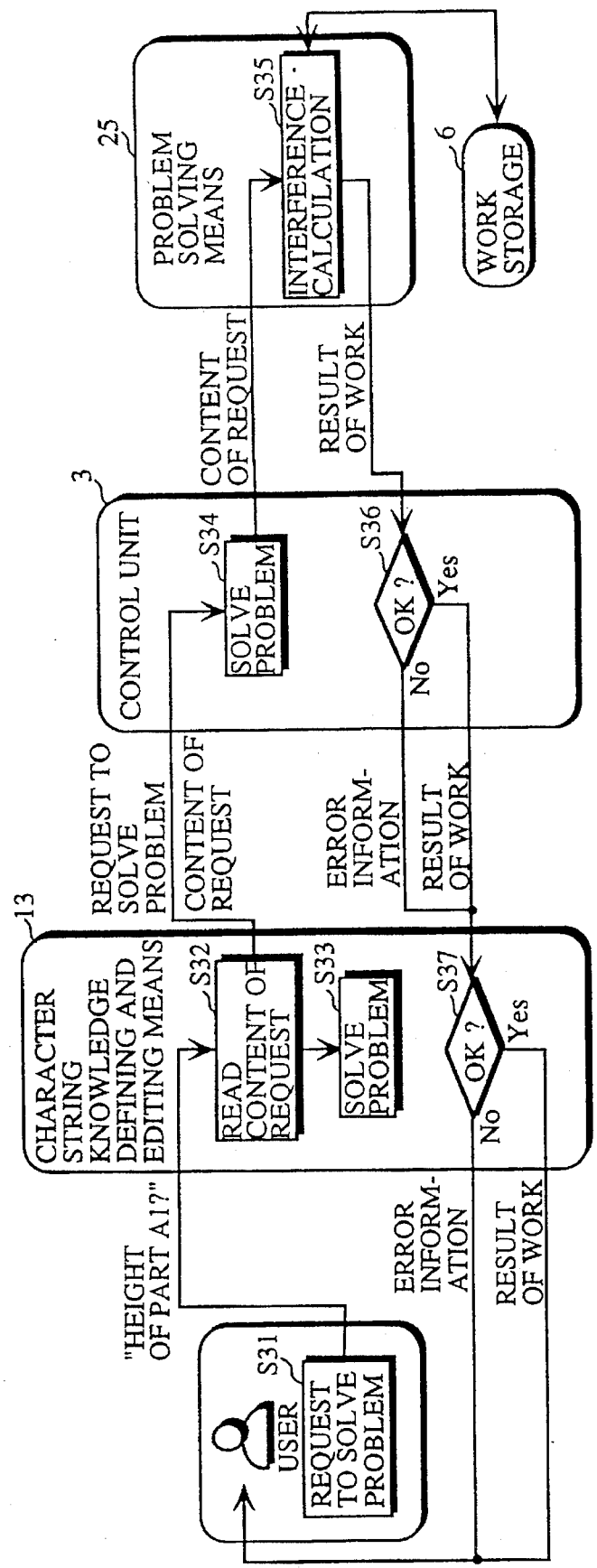
FIG. 9 is a flow chart showing the operation of the knowledge base constructing system in a case where a given problem is solved.

FIG. 9 illustrates the operation of the knowledge base constructing system in a case where a problem is solved on the basis of knowledge already registered. Although description is made of a case where a problem related to the character string knowledge is solved, the same is true for the operation in a case where a problem related to the drafting knowledge or the hierarchical structure knowledge is solved.

If a request to solve a problem, for example, "What is the height of the part A1?" is inputted to the character string knowledge defining and editing means 13 by a user U (step S31), the content of the request to solve the problem (the content of the problem) is read by the character string knowledge defining and editing means 13 (step S32). In addition, the request to solve the problem and the content of the problem are sent to the control unit 3 so as to solve the problem (step S33).

The control unit 3 starts the problem solving means 25 and sends the content of the problem to the problem solving means 25 so as to solve the problem to be solved when the request to solve the problem and the content of the problem are sent (step S34). Consequently, the problem solving means 25 performs interference and calculation on the basis of knowledge stored in the work storage device 6, to obtain an answer to the content of the problem (step S35). The result of the work is fed back to the control unit 3.

The control unit 3 judges whether or not the answer to the content of the problem is obtained on the basis of the result of the work (step S36). When the answer to the content of the problem is not obtained, the control unit 3 feeds back error information to the character string knowledge defining and editing means 13. When the answer to the content of the problem is obtained, the control unit 3 feeds back the result of the work to the character string knowledge defining and editing means 13.

The character string knowledge defining and editing device 13 judges whether or not the answer to the content of the problem is obtained on the basis of the information fed back from the control unit 3 (step S37), and feeds back the result of the work to the user U if the answer to the content of the problem is obtained, while feeding back error information to the user U if the answer to the content of the problem is not obtained.

Figure 10:
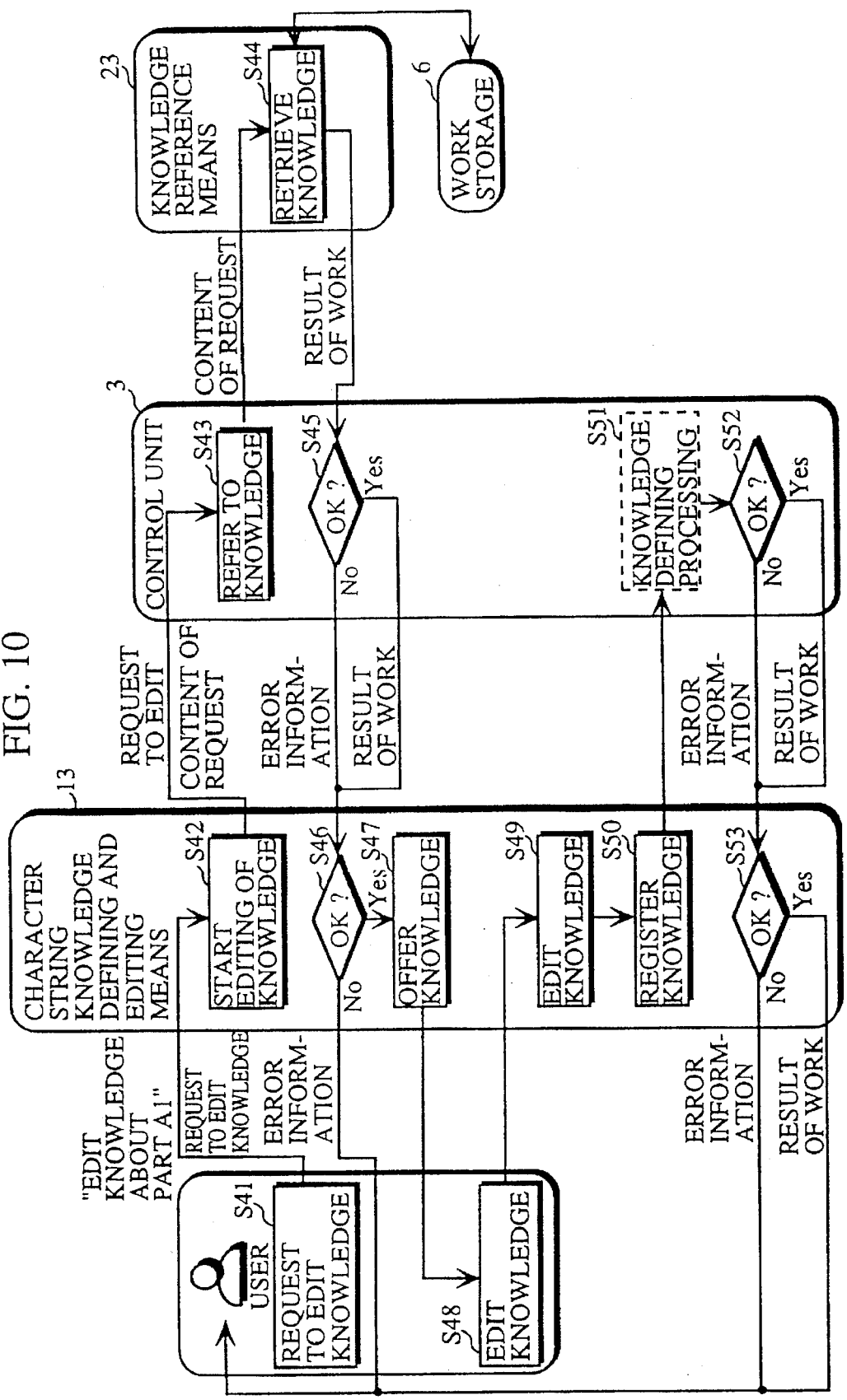
FIG. 10 is a flow chart showing the operation of the knowledge base constructing system in a case where knowledge is edited.
Figure 11:
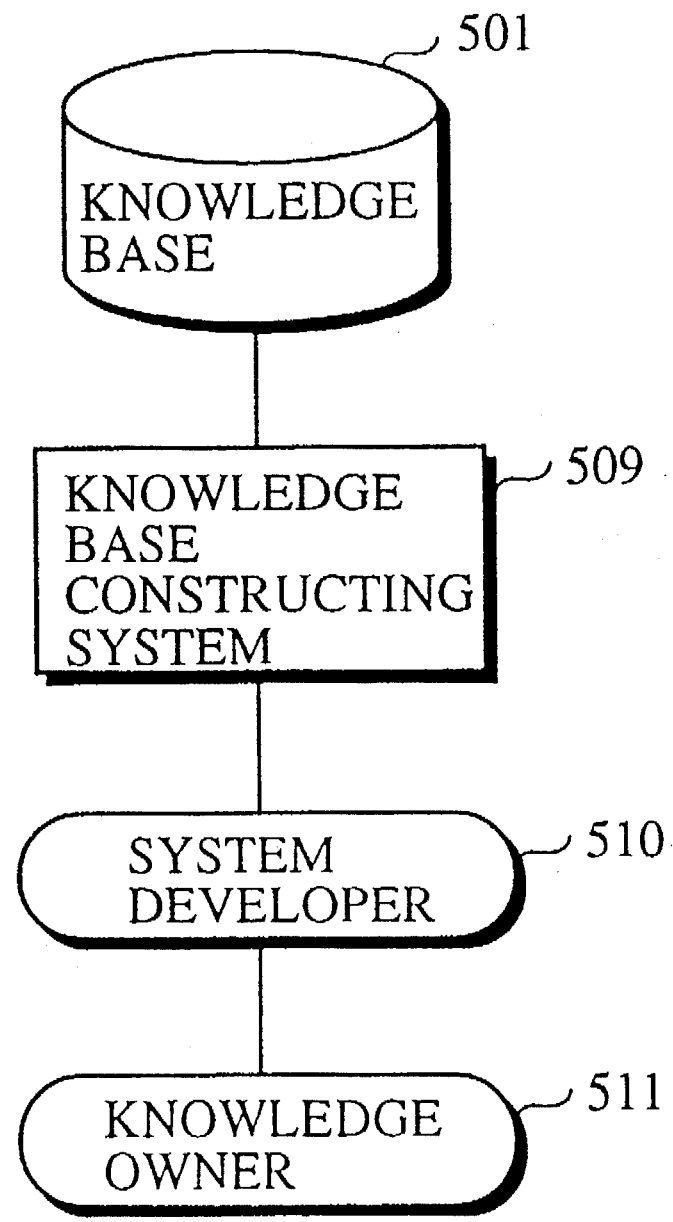
FIG. 11 is an explanatory view for explaining a knowledge base constructing method carried out by a conventional knowledge base constructing system.
Figure 12:
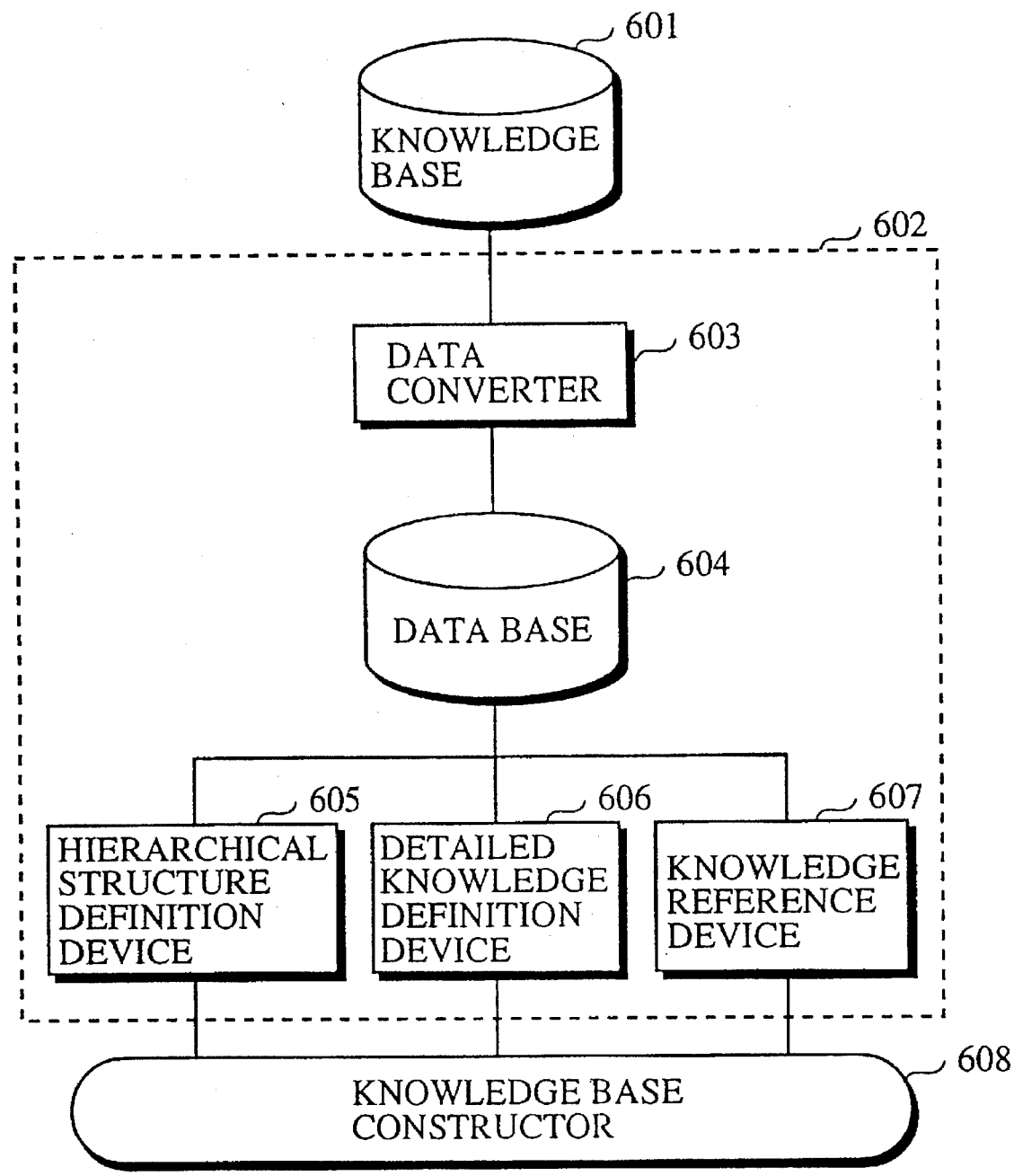
FIG. 12 is an explanatory view for explaining a knowledge base constructing method carried out by another conventional knowledge base constructing system.

FIG. 10 illustrates the operation of the knowledge base construction device in a case where knowledge already registered is edited. Although description is made of a case where the character string knowledge is edited, the same is true for a case where the drafting knowledge or the hierarchical structure knowledge is edited.

If a request to edit knowledge, for example, "edit knowledge related to the part A1" is inputted to the character string knowledge defining and editing means 13 by a user U (step S41), the content of the request to edit knowledge is read by the character string knowledge defining and editing means 13, and the request to edit knowledge and the content of the request are sent to the control unit 3 (step S42).

The control unit 3 starts the knowledge reference means 23 and sends the content of the request to edit knowledge to the knowledge reference means 23 so as to retrieve knowledge corresponding to the content of the request to edit knowledge if the request to edit knowledge and the content of the request are sent (step S43). Consequently, the knowledge reference means 23 retrieves knowledge corresponding to the content of the request to edit knowledge from the work storage device 6 (step S44), and feeds back the result of the retrieval (the result of the work) to the control unit 3.

The control unit 3 judges whether or not the knowledge corresponding to the content of the request to edit knowledge is retrieved on the basis of the result of the work (step S45). When the knowledge corresponding to the content of the request to edit knowledge is not retrieved, the control unit 3 feeds back error information to the character string knowledge defining and editing means 13. In this case, the character string knowledge defining and editing means 13 feeds back error information to the user U.

When the knowledge corresponding to the content of the request to edit knowledge is retrieved (YES in the step S45), the control unit 3 feeds back the result of the work to the character string knowledge defining and editing means 13. In this case, the character string knowledge defining and editing means 13 offers the retrieved knowledge to the user U (step S47).

The user U performs an editing operation for the offered knowledge (step S48). The character string knowledge defining and editing means 13 edits knowledge in accordance with the operation performed by the user U (step S49). The character string knowledge defining and editing means 13 requests the control unit 3 to register the edited knowledge if the editing is terminated (step S50). The control unit 3 performs knowledge defining processing as described in FIG. 7 for the edited knowledge (step S51).

The knowledge defining processing comprises the above described processing such as the processing for knowledge format check (steps S4 to S6 in FIG. 7), the processing for knowledge format conversion (steps S7 and S9 to S11 in FIG. 7), the processing for checking the validity of knowledge (steps S12 to S14 in FIG. 7), and the processing for new registration (steps S15 to S17 in FIG. 7).

When an error occurs in the knowledge defining processing, error information is sent to the character string knowledge defining and editing means 13 from the control unit 3 (step S52). This error information is offered to the user U from the character string knowledge defining and editing means 13 (step S53).

When no error occurs in the knowledge defining processing, the result of the work is sent to the character string knowledge defining and editing means 13 from the control unit 3 (step S52). The result of the work is offered to the user U from the character string knowledge defining and editing means 13 (step S53).

Even when a request different from the request to refer to knowledge, for example, the above described request to edit knowledge is made by the user U, the control unit 3 can start the knowledge reference means 23 as required to make the knowledge reference means 23 take out required knowledge.

Although in the above described embodiment, a shape is represented in a three-dimensional manner, the shape may be represented in a two-dimensional manner representation.

Furthermore, although in the above described embodiment, a hierarchical structure constituted by three elements, that is, a product, a component and a part is illustrated, the part may be further subdivided to add shape elements constituting the part, for example, a point, a line and a curve to the hierarchical structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knowledge base constructing system comprising:

model shape knowledge registering means for previously defining knowledge about a model shape of a part and registering the model shape knowledge in a knowledge base;

part type displaying means for displaying a part list for making an operator designate a part related to knowledge to be defined;

part type inputting means for making the operator designate the part related to the knowledge to be defined on the basis of the part list;

knowledge type displaying means for displaying a knowledge type list for making the operator designate the type of the knowledge to be defined;

knowledge type inputting means for making the operator designate the type of the knowledge on the basis of the knowledge type list;

knowledge defining way displaying means for displaying a knowledge defining way candidate list for making the operator designate a knowledge defining way which can be used with respect to the designated type of the knowledge;

knowledge defining way inputting means for making the operator designate the knowledge defining way on the basis of the knowledge defining way candidate list;

required information item displaying means for displaying a required information item to be inputted in accordance with the designated type of the knowledge and the designated knowledge defining way;

required information inputting means for making the operator input required information on the basis of the displayed information item to be inputted;

knowledge defining means for defining the knowledge on the basis of the inputted required information and registering the knowledge in the knowledge base; and knowledge processing means for processing the knowledge inputted to the knowledge inputting means to produce a knowledge base, said knowledge processing means comprising validity judging means for judging the validity of the knowledge defined by the knowledge defining means, for displaying, when it is judged that the knowledge lacks the validity, the result of the judgement, the reason for the judgement and knowledge data related to the reason for the judgement, and for urging the knowledge data related to the reason for the judgement to be corrected.

2. The knowledge base constructing system according to claim 1, further comprising part shape displaying means for displaying the shape of the part designated by the part type inputting means, and shape recognizing means for recognizing, by making the operator designate a shape element, the designated shape element on a part shape displayed by the part shape displaying means and sending the result of the recognition to the knowledge defining means.

3. The knowledge base constructing system according to claim 1, further comprising part shape displaying means for displaying the shape of the part designated by the part type inputting means, and shape recognizing means for recognizing, by making the operator designate a shape element, the designated shape element on a part shape displayed by the part shape displaying means and sending the result of the recognition to the knowledge defining means.

4. A knowledge base constructing system comprising:

knowledge inputting means to which knowledge of a knowledge base constructor is inputted for defining knowledge to be constructed;

knowledge processing means for processing the knowledge inputted to said knowledge inputting means to produce a knowledge base;

controlling means for controlling said knowledge inputting means and said knowledge processing means; and a storage device for storing a work hysteresis of said knowledge processing means and the knowledge base produced by the knowledge processing means, said knowledge inputting means comprising drafting knowledge defining and editing means for defining and/or editing drafting knowledge, hierarchical structure defining and editing means for defining and/or editing a hierarchical structure, and character string knowledge defining and editing means for defining and/or editing character string knowledge, wherein said knowledge processing means comprises knowledge base managing means for controlling said storage device, knowledge format converting means for making conversion between a format of the knowledge inputted to said knowledge inputting means and a format of a knowledge language used as the knowledge base, and knowledge reference means for retrieving required data from the knowledge base stored in said storage device, whereby the drafting knowledge, the hierarchical structure and the character string knowledge are individually inputted and are defined.

5. The knowledge base constructing system according to claim 4, wherein said knowledge processing means comprises knowledge base managing means for controlling said storage device, knowledge format converting means for making conversion between a format of the knowledge defined by said knowledge inputting means and a format of the knowledge base, knowledge reference means for retrieving required data from the knowledge base stored in said storage device, and knowledge validity judging means for judging the validity of the knowledge defined by said knowledge inputting means.

6. The knowledge base constructing system according to claim 4, wherein said knowledge processing means comprises knowledge base managing means for controlling said storage device, knowledge format converting means for making conversion between a format of the knowledge defined by said knowledge inputting means and a format of the knowledge base, knowledge reference means for retrieving required data from the knowledge base stored in said storage device, and problem solving means for finding an answer to a given problem on the basis of the knowledge base stored in said storage device.

7. The knowledge base constructing system according to claim 4, wherein said knowledge processing means comprises knowledge base managing means for controlling said storage device, knowledge format converting means for making conversion between a format of the knowledge defined by said knowledge inputting means and a format of the knowledge base, knowledge reference means for retrieving required data from the knowledge base stored in said storage device, knowledge validity judging means for judging the validity of the knowledge defined by said knowledge inputting means, and problem solving means for finding an answer to a given problem on the basis of the knowledge base stored in said storage device.

8. The knowledge base constructing system according to claim 4, wherein said drafting knowledge is shape knowledge.

9. The knowledge base constructing system according to claim 4, wherein said drafting knowledge is shape knowledge and arrangement knowledge.

* * * * *